US012338652B2

(12) United States Patent
Schuh

(10) Patent No.: US 12,338,652 B2
(45) Date of Patent: Jun. 24, 2025

(54) LOCKABLE SHACKLE FOR A LOCKBOX

(71) Applicant: ShowMojo, Inc., Claymont, DE (US)

(72) Inventor: Peter Schuh, Washington, DC (US)

(73) Assignee: ShowMojo, Inc.

( * ) Notice: Subject to any disclaimer, the term of this patent is extended or adjusted under 35 U.S.C. 154(b) by 146 days.

(21) Appl. No.: 18/355,210

(22) Filed: Jul. 19, 2023

(65) Prior Publication Data

US 2024/0117655 A1 Apr. 11, 2024

Related U.S. Application Data

(60) Provisional application No. 63/413,518, filed on Oct. 5, 2022.

(51) Int. Cl.

| | |
|---|---|
| ***E05B 67/22*** | (2006.01) |
| ***E05B 19/00*** | (2006.01) |
| ***E05B 67/02*** | (2006.01) |
| ***E05B 67/38*** | (2006.01) |

(52) U.S. Cl.

CPC .......... *E05B 19/0005* (2013.01); *E05B 67/02* (2013.01); *E05B 67/22* (2013.01); *E05B 67/38* (2013.01)

(58) Field of Classification Search

CPC ...... E05B 19/0005; E05B 67/02; E05B 67/22; E05B 67/38; E05B 35/08; E05B 35/086; E05B 35/14

USPC .............................................................. 70/63

See application file for complete search history.

(56) References Cited

U.S. PATENT DOCUMENTS

| | | | | |
|---|---|---|---|---|
| 146,856 | A * | 1/1874 | Ahrend | E05B 67/22 70/38 C |
| 3,436,937 | A | 4/1969 | Barrett | |
| 4,468,940 | A | 9/1984 | Davis | |
| 4,641,505 | A | 2/1987 | Maurice | |
| 5,737,947 | A | 4/1998 | Ling | |
| 6,330,816 | B1 * | 12/2001 | O'Connor | E05B 19/0005 70/2 |
| 8,141,396 | B1 | 3/2012 | Yang | |
| 8,341,986 | B2 | 1/2013 | Sakai et al. | |
| 8,966,946 | B2 | 3/2015 | Lai | |
| 9,540,845 | B1 | 1/2017 | Yang | |
| D1,015,849 | S * | 2/2024 | Schuh | D8/333 |
| 2009/0151402 | A1 | 6/2009 | Lee | |
| 2011/0056251 | A1 | 3/2011 | Komlya | |
| 2016/0123040 | A1 | 5/2016 | Hanson et al. | |
| 2016/0340092 | A1 | 11/2016 | Howse | |
| 2020/0347642 | A1 | 11/2020 | Yang | |

* cited by examiner

*Primary Examiner* — Suzanne L Barrett

(74) *Attorney, Agent, or Firm* — Eric Karich; Karich & Associates

(57) ABSTRACT

A lockbox has a body housing that includes a back portion and a front portion which together enclose an interior space for storing contents. A shackle slidingly engages with the body housing so that the shackle can slide between a lowered locked position and a raised unlocked position. A lockbox security lock mechanism is provided on an exterior surface of the body housing for locking the front portion in a closed position for preventing access into the interior space of the body housing. A shackle security lock mechanism is positioned within the interior space of the body housing for engaging the shackle for preventing the shackle from moving to the raised unlocked position until the shackle security lock mechanism is unlocked.

16 Claims, 6 Drawing Sheets

LOCKABLE SHACKLE FOR A LOCKBOX

CROSS-REFERENCE TO RELATED APPLICATIONS

This application for a utility patent claims the benefit of U.S. Provisional Application No. 63/413,518, filed Oct. 5, 2022.

BACKGROUND OF THE INVENTION

Field of the Invention

This invention relates generally to lockboxes, and more particularly to a lockbox that includes a lockable shackle that prevents removal of the lockbox until the lockable shackle is unlocked.

Description of Related Art

The prior art teaches a wide variety of lockboxes with various configurations of locking mechanisms; however, none of the prior art lockboxes teach a lockbox that includes an external lock for locking the box for allowing access to the contents of the lockbox, and a second lock inside the lockbox which allows removal of the shackle.

Lai, U.S. Pat. No. 8,966,946, teaches a lock box that includes a body housing that has a storage compartment. The housing body has holes to receive a toe and heel of a shackle. The heel of the shackle remains inside of the body housing and the toe can be moved away from the body to a lock releasing position. The shackle is locked to the body housing via a combination lock that can be released from the body from the locked position to the open position by pushing down on the shackle to turn the dials to a correct combination. The heel of the shackle engages with the hole of the storage compartment cover to prevent the storage compartment from unlocking until the shackle has been released. Once the shackle has been unlocked, it moves up to allow the housing body to open, and also for the shackle to be removed. The problem with this configuration is that anyone who can open the lock box to remove the contents (key), they can also remove the lockbox itself. It is desired, in the present invention, to enable access to the housing body to access the key, but NOT allow the lockbox to be removed.

A similar lockbox is shown in Maurice, U.S. Pat. No. 4,641,505, but this lockbox includes two built-in locks, a first lock to access the body housing to access the key, and a second lock to enable the shackle to be opened and the lockbox taken. While this enables separate control over access to the key, and access to the lockbox, both locks are readily accessible from the outside. It is possible that picking the first lock would enable taking the lockbox, without having the key to the second lock. It is desired that the first lock only be accessible via the body housing, so that both locks must be used to unlock and take the lockbox. It is also desirable that the first lock be inexpensive and made of commonly available components, rather than a completely custom-made additional lock.

Komiya, U.S. 2011/0056251, teaches a padlock that includes a casing having a bottom shell and a cover shell pivoted with each other, a shackle movably mounted in the bottom shell, a constraint member movably mounted in the cover shell and having a hook portion for hooking the shackle to lock the cover shell and the bottom shell, and a combination lock unit mounted in the cover shell for controlling the constraint member to determine whether the constraint member is allowable to move away from the shackle. This is the commonly used mechanism, wherein access to the internal compartment enables the user to release the shackle (via latch 40) by simply moving the latch, and there is no mechanism for locking this latch and preventing theft of the lockbox once the cover shell is opened.

Yang, U.S. Pat. No. 9,540,845, teaches an even more complex version of a lock box unit that includes a case, an operation unit and an electric control unit. A shackle is connected to the case, and the operation unit controls the first end of the shackle to be disengaged from the case. A touch screen is connected to the outside of the cover to control the electric control unit which controls the operation unit to quickly and easily unlock the lock unit by popping the first end of the shackle out from the case.

The prior art teaches a lockbox that includes a single lock both for accessing the lockbox contents (e.g., key), and for detaching the shackle. The prior art also teaches a lockbox (Maurice) that includes two external locks, one for locking the shackle and a second for locking the box itself. However, the prior art does not teach a lockbox that has an external lock for locking the box for allowing access to the contents of the lockbox, and a second lock inside the lockbox which allows removal of the shackle, and wherein only opening both locks allows removal of the shackle for removing the lockbox. The present invention fulfills these needs and provides further advantages as described in the following summary.

SUMMARY OF THE INVENTION

The present invention teaches certain benefits in construction and use which give rise to the objectives described below.

The present invention provides a lockbox that includes a body housing that includes a back portion and a front portion which together enclose an interior space for storing contents. A shackle slidingly engages with the body housing so that the shackle can slide between a lowered locked position and a raised unlocked position. A lockbox security lock mechanism is provided on an exterior surface of the body housing for locking the front portion in a closed position for preventing access into the interior space of the body housing. A shackle security lock mechanism is positioned within the interior space of the body housing for engaging the shackle for preventing the shackle from moving to the raised unlocked position until the shackle security lock mechanism is unlocked.

In another embodiment, the shackle and the shackle locking mechanism may be sold as a separate product that may be installed in a prior-art lockbox.

A primary objective of the present invention is to provide a lockable shackle for use in a lockbox having advantages not taught by the prior art.

Another objective is to provide a lockbox that includes a lockbox security lock mechanism to prevent access to an interior space on the lockbox, and also includes a second shackle security lock mechanism positioned within the interior space, for preventing removal of the lockbox itself.

A further objective is to provide a lockbox that provides this added security feature at a minimal increase in cost.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention.

DETAILED DESCRIPTION OF THE INVENTION

The above-described drawing figures illustrate the invention, a lockbox that includes an external lock for locking the lockbox itself for allowing access to the contents of the lockbox, and a second lock inside the lockbox which allows removal of a shackle for physical removal of the lockbox. In one embodiment, the shackle may be sold as a separate product that may be installed in a prior-art lockbox. In another embodiment, the entire lockbox may be sold as a unit.

Figure 1:
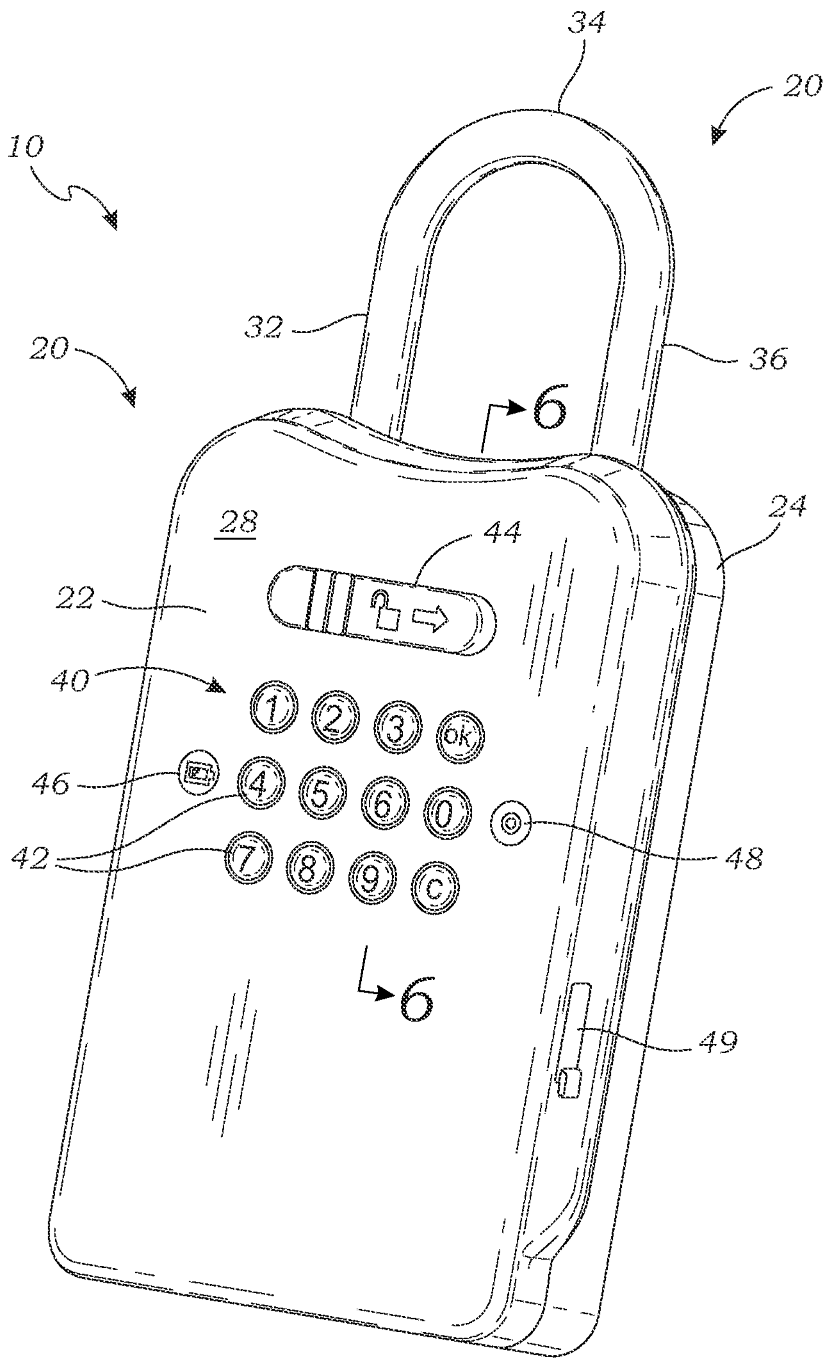
FIG. 1 is a perspective view of a lockbox according to one embodiment of the present invention, illustrating a lockbox security lock mechanism on an exterior surface of the lockbox for locking a front portion of a body housing in a closed locked position relative to a back portion.

FIG. 1 is a perspective view of a lockbox 10 according to one embodiment of the present invention. As shown in FIG. 1, the lockbox 10 includes a body housing 20 that includes a front portion 22 and a back portion 24 which together enclose an interior space 25 (shown in FIG. 7) for storing contents 12 (e.g., a key, access card, or any other items that a user might want to securely store at a location for easy access). The front portion 22 is movably connected to the back portion 24 so that the front portion 22 can move between a closed position, shown in FIG. 1, and an open position shown in FIG. 7. In the embodiment of FIG. 1, the front portion 22 is attached to the back portion 24 with a hinge 26 (shown in FIG. 7); however, in alternative embodiments, other connections may be used (e.g., sliding, and any other mechanism known in the art for allowing access to the interior of the lockbox 10).

Figure 7:
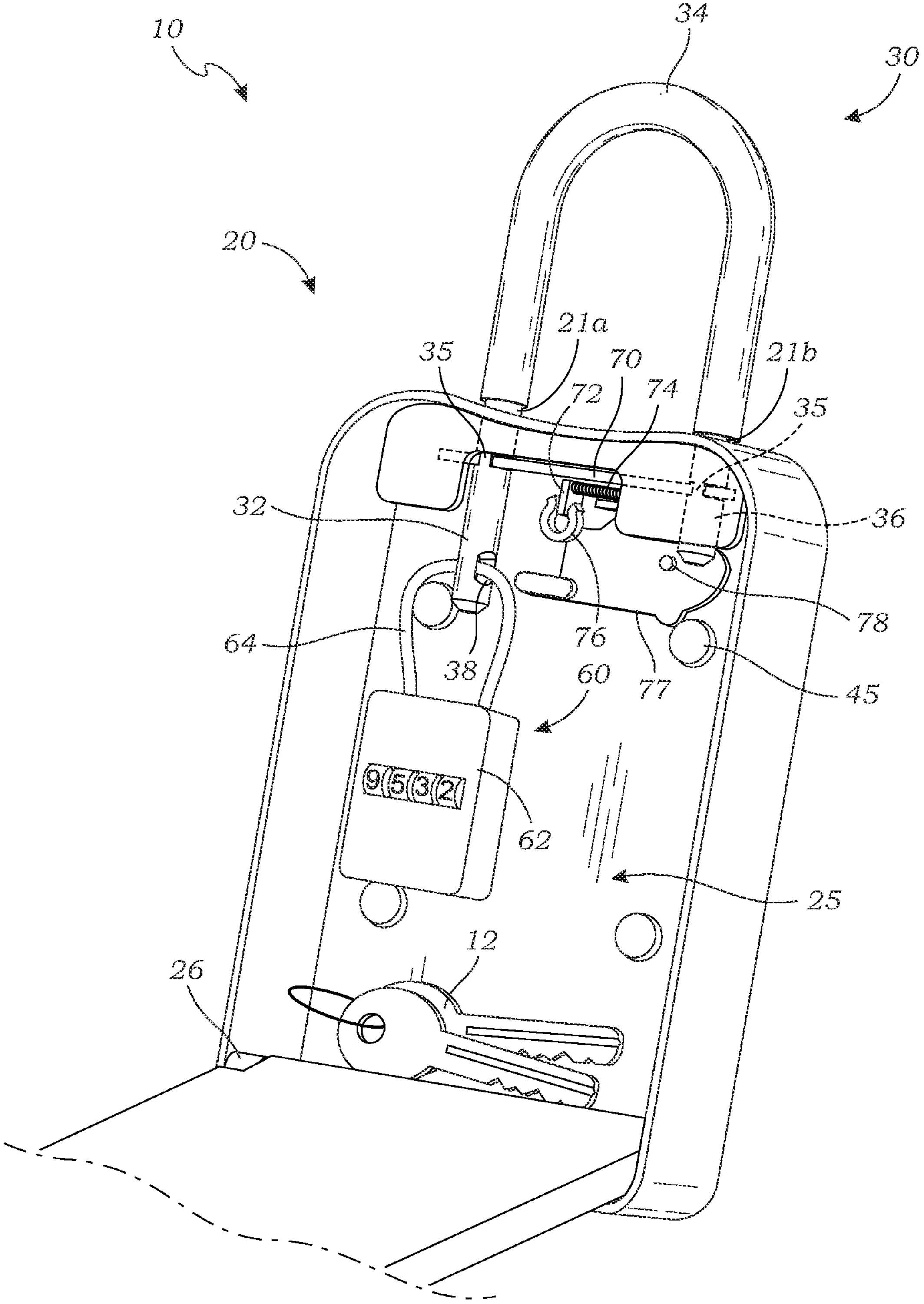
FIG. 7 is a front perspective view of the lockbox, illustrating the front portion moved to an open position relative to the back portion, and further illustrating a shackle security lock mechanism which, in this embodiment, is in the form of a padlock mounted on a first leg of a shackle of the lockbox.

As shown in FIG. 1, the front portion 22 blocks access to the interior space 25 (shown in FIG. 7) and access to the contents 12 while in the closed position of FIG. 1. Once moved to the open position shown in FIG. 7, the front portion 22 does not block access to the interior space 25 and the contents 12 may be removed from the lockbox 10. The lockbox 10 includes a shackle 30 that includes a first leg 32, a curved portion 34, and a second leg 36, so that the shackle 30 forms a generally U-shape in this embodiment. In this embodiment, the shackle is U-shaped and rigid; however, in alternative embodiments, other forms of shackles known in the art may be used. As shown in FIG. 7, the first leg of the shackle 30 has a locking feature, as discussed in greater detail below.

As shown in FIG. 1, a lockbox security lock mechanism 40 is provided on an exterior surface 28 of the lockbox 10 for locking the front portion 22 of a body housing 20 in the closed locked position relative to the back portion 24 for preventing access into the interior space 25 of the body housing 20, or, when unlocked, for allowing the front portion 22 to move to the open position (as shown in FIG. 7).

In this embodiment, the lockbox security lock mechanism 40 is in the form of a combination lock that includes a plurality of buttons 42 and a slide mechanism 44 for moving a locking bar 54 (shown in FIG. 6) for unlocking the lockbox 10, as described in greater detail below. Combination locks are well known in the art, and so the details of its construction and function are not described in greater detail herein, although Lai, U.S. Pat. No. 8,966,946 is hereby incorporated by reference in full for one example of such a locking mechanism. The lockbox security lock mechanism 40 may alternatively be in the form of a dial combination lock, a keyed lock, or any other form of lock positioned on the exterior surface 28 of the lockbox 10; and since this is also well known in the art, it is not described in greater detail herein. Furthermore, while the lockbox security lock mechanism 40 is shown on the front portion 22 of the body housing 20, it could alternatively be location on the back portion 24, so long as it is on the exterior surface 28 of the lockbox 10 and readily accessible while the lockbox 10 is in the closed position.

As shown in FIG. 1, the lockbox 10 may further include additional features, such as a battery indicator 46 (if the lock is electronic), a status indicator light 48, a charging port 49, and any other features known in the art. Obviously, these would not be included in the case where the lock is not electronic.

Figure 2:
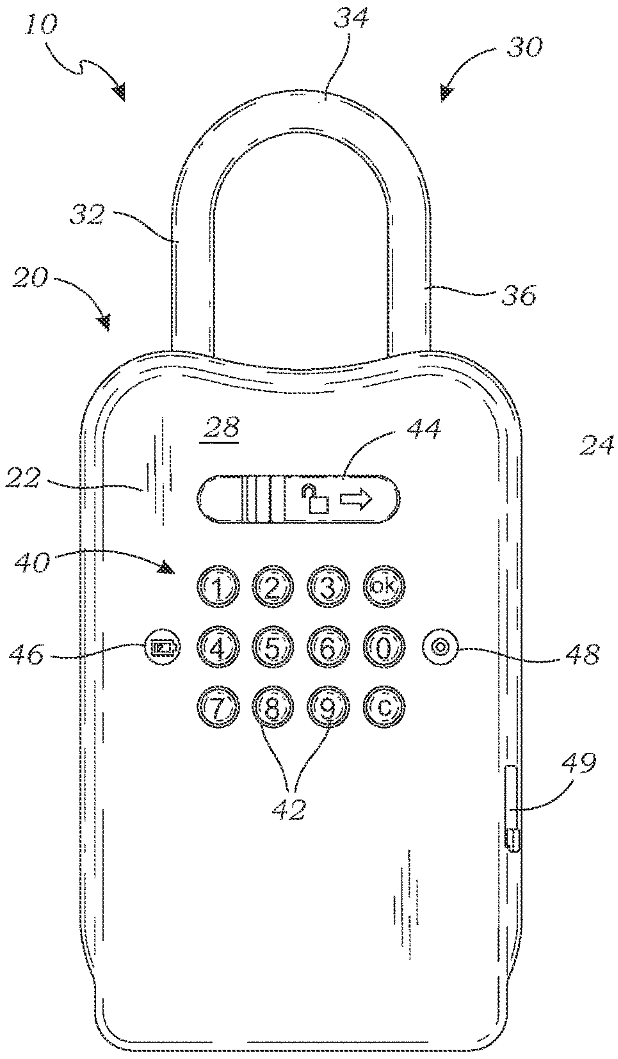
FIG. 2 is a front elevation view of the lockbox.
Figure 3:
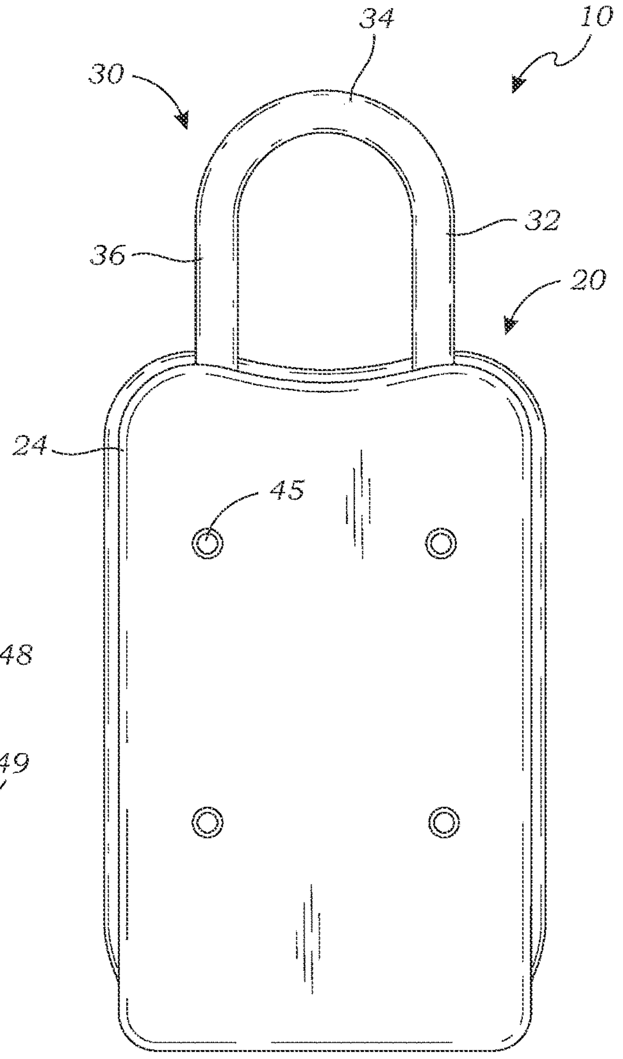
FIG. 3 is a rear elevation view of the lockbox.
Figure 5:
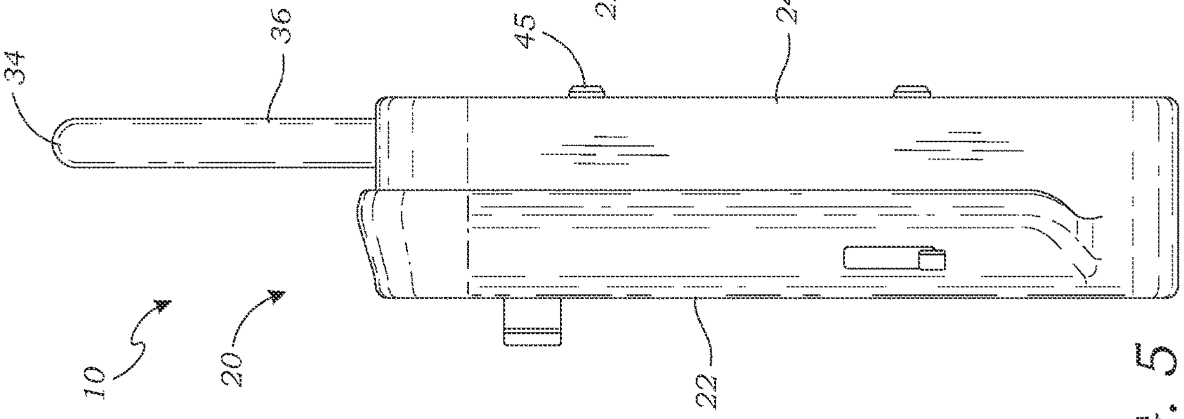
FIG. 5 is a left-side elevation view of the lockbox.
Figure 4:
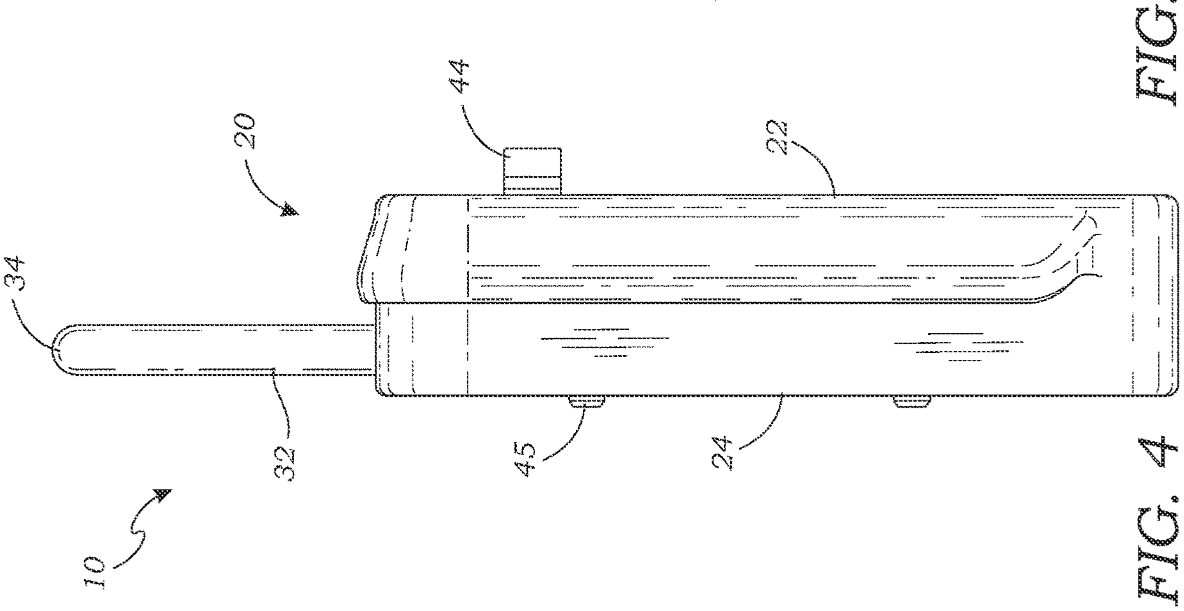
FIG. 4 is a right-side elevation view of the lockbox.

FIG. 2 is a front elevation view of the lockbox 10. FIG. 3 is a rear elevation view of the lockbox 10. FIG. 4 is a right-side elevation view of the lockbox 10. FIG. is a left-side elevation view of the lockbox 10. In addition to the features mentioned above, FIGS. 3-5 further illustrates a plurality of resilient plugs 45 that extend through the rear portion 24 of the body housing 20 for providing a cushioning material between the rear portion of the lockbox 10 and the surrounding environment (e.g., a door to which the lockbox 10 may be fastened). These plugs 45 may be removed for various purposes, as required, but keep the interior compartment of the lockbox 10 watertight when closed.

Figure 6:
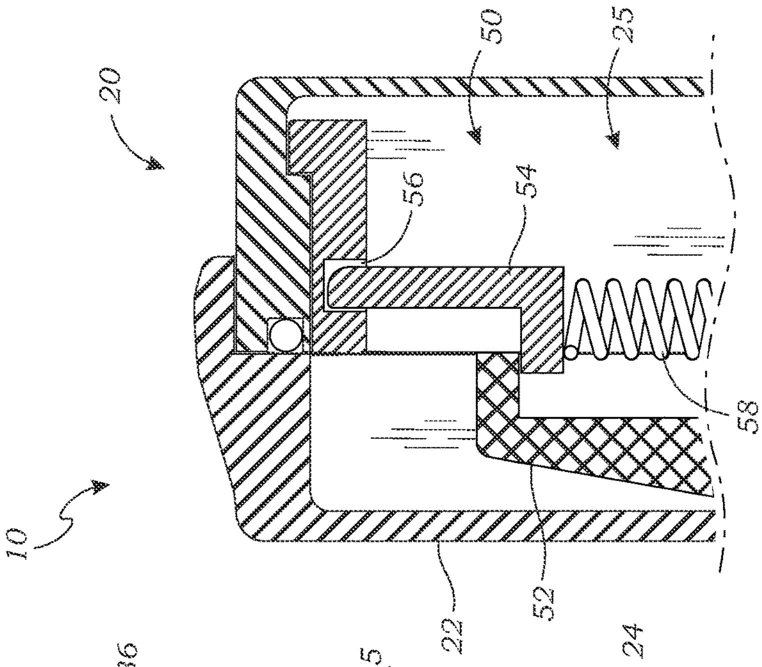
FIG. 6 is a section view of the lockbox taken along lines 6-6 in FIG. 1.

FIG. 6 is a section view of the lockbox 10 taken along lines 6-6 in FIG. 1. As shown in FIG. 6, the slide mechanism 44 shown in FIG. 1 is operatively connected with a first latch mechanism 50 for locking the front portion 22 of the body housing 20 in the locked position. In this embodiment, an arm 52 operably connected with the slide mechanism 44 moves a locking bar 54 against the bias of a biasing element 58 (e.g., spring) to disengage from a receiver 56 of the rear portion 24. This form of latching mechanism 50 (and equivalent structures) is well known in the art, and is therefore not described in greater detail herein.

FIG. 7 is a front perspective view of the lockbox 10, illustrating the front portion 22 moved to an open position relative to the back portion 24, and further illustrating a shackle security lock mechanism 60 which, in this embodiment, is in the form of a padlock 62 mounted on a first leg 32 of the shackle 30 of the lockbox 10. In this embodiment, a locking feature 38 of the first leg 32 is in the form of a hole through the first leg 32 of the shackle 30, and the padlock 62 includes a padlock shackle 64 that is sized to fit through the hole in the first leg 32. As shown in FIG. 7, the contents 12, in this case keys, are located within the interior compartment 25 along with the shackle security lock mechanism 60, and both can only be accessed once the lockbox 10 has been opened.

Figure 8:
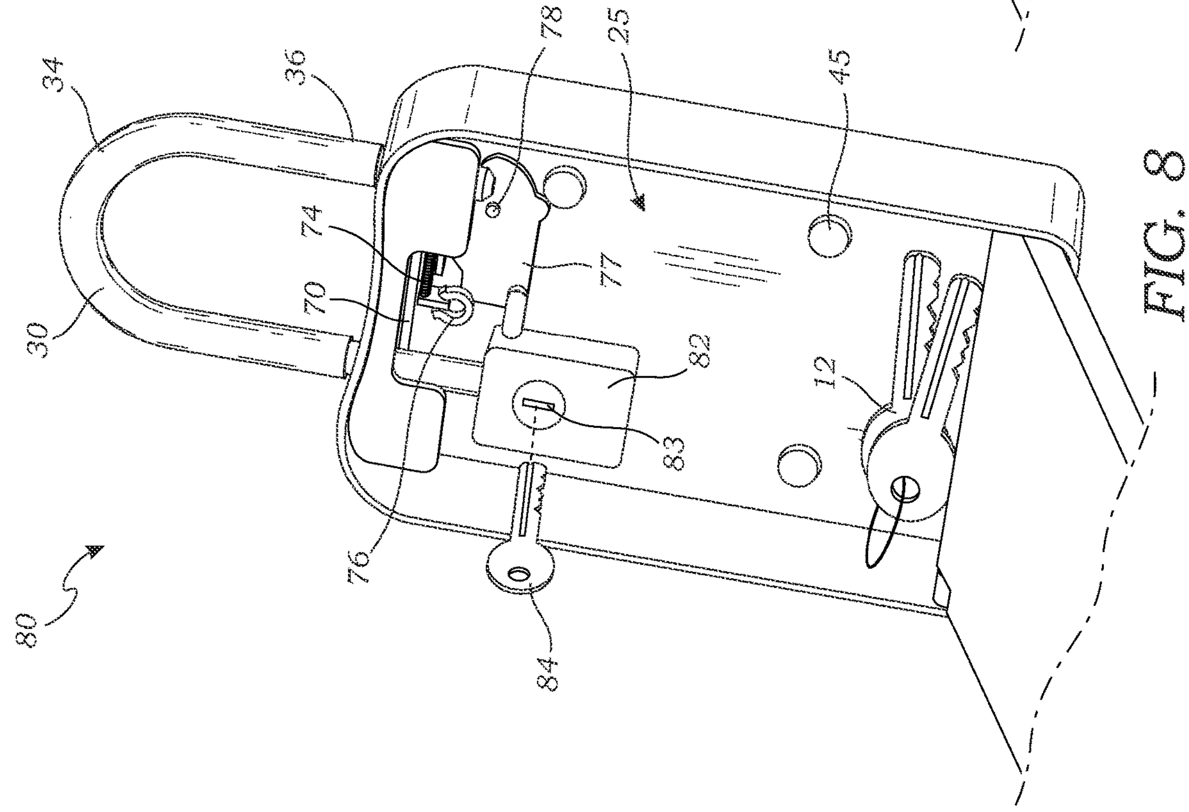
FIG. 8 is a front perspective view of a second embodiment of the lockbox, similar to FIG. 7, wherein the shackle security lock mechanism is in the form of a mounted lock mounted on the shackle.

In the illustrated embodiment, the padlock includes a combination lock mechanism; however, in alternative embodiments, the padlock may utilize a keyed lock mechanism similar to shown in FIG. 8. The padlock shackle may be ridged or flexible, and may be shaped in any manner known in the art.

Also shown in FIG. 7, the first and second legs 32 and 36 fit through first and second holes 21*a* and 21*b*, respectively, in the body housing 20 so that the shackle 30 can slide between a lowered locked position and a raised unlocked position. The lockbox 10 may further include a latch mechanism 70 that manually locks the shackle 30 in place, the latch mechanism 70 being mounted within the interior compartment 25 of the body housing 20. In this embodiment, the latch mechanism 70 is in the form of a sliding plate that includes slots for receiving the shackle arms therethrough. The sliding plate 70 engages notches 35 (or some other structure, bushing, or other equivalent feature) in the shackle 30. The latch mechanism 70 may be moved via manually pushing an arm 72 against the bias of spring 74 to unlock the shackle 30. In this embodiment, no security locking features are included in this locking mechanism.

The latch mechanism 10 engaging with notches 35 on the first and second legs 32 and 36 of the shackle 30, respectively, to lock the shackle 30 in the lowered locked position, until released by the release lever arm 72. The latch mechanism 10 of this embodiment is positioned entirely within the interior space 25, and does not include a security locking mechanism.

Movement of the latch mechanism 70 may be prevented by a latch lock 76 that engages and manually locks the latch mechanism 70 to prevent its movement. In this case, the locking feature 76 is in the form of a clamping element, in this case a c-shaped clamp, which is mounted on a body 77 that is pivotally connected to the rear portion 24 of the lockbox 10 via a pivot point 78. This construction is also shown in FIG. 8-9, with FIG. 8 showing the latch mechanism 70 in a locked position, and FIG. 9 showing an unlocked position.

FIG. 8 is a front perspective view of a second embodiment of the lockbox 80, similar to FIG. 7, only wherein the shackle security lock mechanism 82 is in the form of a security lock mounted directly onto one of the legs of the shackle 30. FIG. 9 is an exploded front perspective view of the lockbox of FIG. 8, illustrating the shackle security lock mechanism 82 once it has been removed from the shackle 30. In this case, the shackle security lock mechanism 82 includes a keyed lock 83 that receives a key 84 for lockingly engaging the locking feature 38, in this case a hole, alternatively could be a notch, or other form of shaped feature which the shackle security lock mechanism 82 may engage with, on one or both of the legs of the shackle 30. In this case, the physical body of the shackle security lock mechanism 82 prevents the shackle 30 from being removed.

Figure 9:
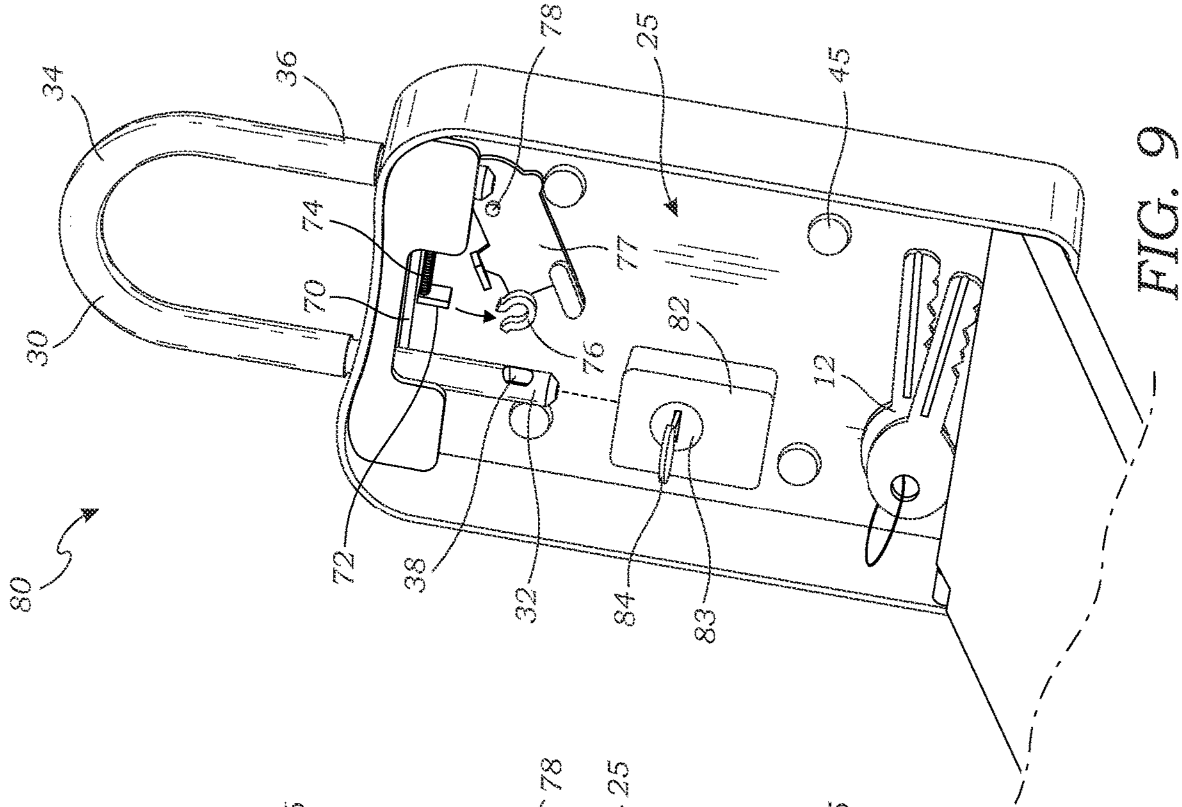
FIG. 9 is an exploded front elevation view of the lockbox of FIG. 8, illustrating the mounted lock once it has been removed from the shackle.

As shown in FIGS. 8-9, the shackle security lock mechanism 82 is positioned entirely within the interior space 25 of the body housing 20 and attached to the locking feature 38 of the first leg for preventing moving the shackle 30 to the raised unlocked position until the shackle security lock mechanism 82 is unlocked to allow moving the shackle 30 to the raised unlocked position, wherein the shackle security lock mechanism 82 is positioned entirely within the interior space 25 when the shackle security lock mechanism 82 is locked and the front portion 22 of the body housing 20 is in the closed position.

In another embodiment, a lock mechanism (not shown), which may be similar to the shackle security lock mechanism 82 of FIGS. 8-9, may be lockingly secured within the interior space 25 to block the movement of the latch lock 76 (e.g., by blocking movement of the body 77, or otherwise), so that the unlocking of the shackle may be prevented until this lock mechanism is unlocked. The lock mechanism may be locked, for example, to the shackle, the body of the lockbox 80, the body 77, or any other location that is positioned inside the interior space 25.

Figure 10:
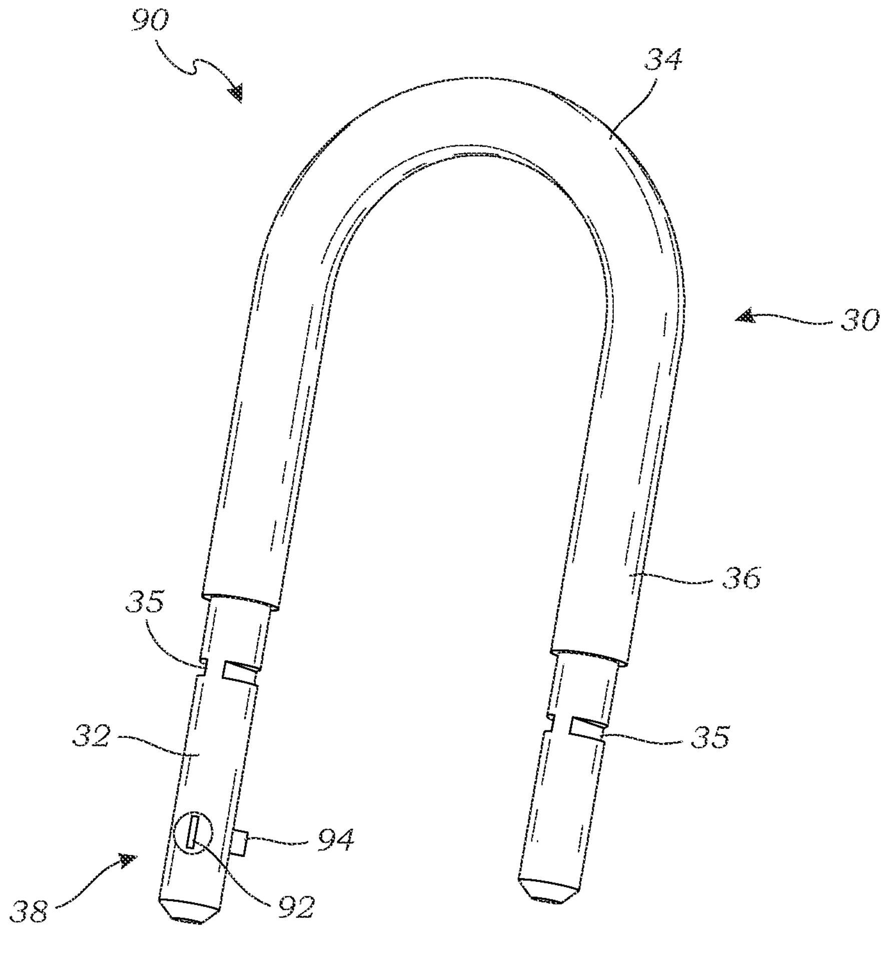
FIG. 10 is a perspective view of another embodiment of a shackle that may be used in the present invention.

FIG. 10 is a perspective view of another embodiment of a shackle 90 that may be used in the present invention. In this embodiment, the shackle 90 includes a security locking mechanism 92 incorporated directly into one of the legs of the shackle 30, in this case in the first leg 32. The locking feature 38 in this case is within the leg 32 itself, an opening or bore which receives the mechanism 92. In this case, actuation of the mechanism 92 causes of protrusion 94 (e.g., bolt, latch, hook, etc.) to extend and physically prevent the shackle 90 from being removed. By building the security locking mechanism 92 directly into the shackle 90, there are no lock components which may be lost.

In another embodiment, the mechanism 92 (or any of the other security locks described herein) may be controlled electronically (e.g., via a Bluetooth controller, or other form of electronic or wireless controller, for locking and unlocking the mechanism 92.

For purposes of this application, the term "security lock" is defined to include any locks that restrict unauthorized access via a key, combination, or other feature known in the art to prevent access to people who are not given permission (e.g., via a key, delivery of a combination, etc.).

For purposes of this application, the term "manual lock" is defined to include any interlocking features which may be manually actuated by anyone with physical access to the device, without use of a key, combination, or equivalent security feature.

The title of the present application, and the claims presented, do not limit what may be claimed in the future, based upon and supported by the present application. Furthermore, any features shown in any of the drawings may be combined with any features from any other drawings to form an invention which may be claimed.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by claims made to the invention.

What is claimed is:

1. A lockable shackle for a lockbox having an interior space, the lockable shackle comprising:

a shackle that includes a first leg, a curved portion, and a second leg, wherein the first and second legs are adapted to slidingly engage with the lockbox so that the shackle can slide between a lowered locked position and a raised unlocked position; and a security lock mechanism that is positioned within the interior space of the body housing for engaging the shackle for preventing the shackle from moving to the raised unlocked position until the shackle security lock mechanism is unlocked; and further comprising a locking feature in the shackle in the form of a hole, and wherein the shackle security lock mechanism is a padlock that includes a padlock shackle that is sized to fit through the hole.

2. A lockbox for storing contents, the lockbox comprising:

a body housing that includes a back portion and a front portion which together enclose an interior space for storing the contents, the front portion being movably connected to the back portion so that the front portion can move between a closed position wherein the front portion blocks access to the interior space and to the contents, and an open position wherein the front portion does not block access to the interior space and the contents may be removed from the lockbox;

a shackle that includes a first leg, a curved portion, and a second leg, wherein the first and second legs slidingly engage with the body housing so that the shackle can slide between a lowered locked position and a raised unlocked position;

a lockbox security lock mechanism on an exterior surface of the body housing for locking the front portion in the closed position for preventing access into the interior space of the body housing, or, when unlocked, for allowing the front portion to move to the open position;

a shackle security lock mechanism that is positioned within the interior space of the body housing for engaging the shackle for preventing the shackle from moving to the raised unlocked position until the shackle security lock mechanism is unlocked; and further comprising a locking feature in the shackle in the form of a hole, and wherein the shackle security lock mechanism is a padlock that includes a padlock shackle that is sized to fit through the hole.

3. The lockbox of claim 1, wherein the padlock includes a keyed lock mechanism.

4. The lockbox of claim 1, wherein the padlock includes a combination lock mechanism.

5. The lockbox of claim 1, wherein the padlock shackle is flexible.

6. The lockbox of claim 1, wherein the padlock shackle is U-shaped and rigid.

7. The lockbox of claim 2, wherein the shackle is U-shaped and rigid.

8. The lockbox of claim 2, further comprising a latch mechanism mounted on an interior surface of the body housing, within the interior compartment, the latch mechanism engaging with notches in the shackle to lock the shackle in the lowered locked position, until released by a release lever, the latch mechanism being positioned entirely within the interior space.

9. The lockbox of claim 8, further comprising a latch lock for lockingly engaging the latch mechanism to prevent movement of the latch mechanism until disengaged.

10. A lockbox for storing contents, the lockbox comprising:

a body housing that includes a back portion and a front portion which together enclose an interior space for storing the contents, the front portion being movably connected to the back portion so that the front portion can move between a closed position wherein the front portion blocks access to the interior space and to the contents, and an open position wherein the front portion does not block access to the interior space and the contents may be removed from the lockbox;

a shackle that includes a first leg, a curved portion, and a second leg, the first leg having a locking feature;

wherein the first and second legs fit through first and second holes, respectively, in the body housing so that the shackle can slide between a lowered locked position and a raised unlocked position;

a latch mechanism mounted on an interior surface of the body housing, within the interior compartment, the latch mechanism engaging with notches in the shackle to lock the shackle in the lowered locked position, until released by a release lever, the latch mechanism being positioned entirely within the interior space;

further comprising a latch lock for lockingly engaging the latch mechanism to prevent movement of the latch mechanism until disengaged;

a lockbox security lock mechanism on an exterior surface of the body housing for locking the front portion in the closed position for preventing access into the interior space of the body housing, or, when unlocked, for allowing the front portion to move to the open position;

a shackle security lock mechanism that is positioned within the interior space of the body housing and attached to the locking feature of the first leg for preventing moving the shackle to the raised unlocked position until the shackle security lock mechanism is unlocked to allow moving the shackle to the raised unlocked position, wherein the shackle security lock mechanism is positioned entirely within the interior space when the shackle security lock mechanism is locked and the front portion of the body housing is in the closed position.

11. The lockbox of claim 10, wherein the locking feature of the first leg of the shackle is a hole through the first leg, and wherein the shackle security lock mechanism is a padlock that includes a padlock shackle that is sized to fit through the hole in the first leg.

12. The lockbox of claim 11, wherein the padlock includes a keyed lock mechanism.

13. The lockbox of claim 11, wherein the padlock includes a combination lock mechanism.

14. The lockbox of claim 11, wherein the padlock shackle is flexible.

15. The lockbox of claim 11, wherein the padlock shackle is U-shaped and rigid.

16. The lockbox of claim 10, wherein the shackle is U-shaped and rigid.

* * * * *